3,213,085
19-LOWER ALKYL-Δ⁴-PREGNEN-20-ONE
DERIVATIVES
Albert Bowers, Mexico City, Mexico, assignor to
Syntex Corporation, Panama, Panama, a corporation of Panama
No Drawing. Filed June 12, 1962, Ser. No. 201,776
11 Claims. (Cl. 260—239.55)

The present invention relates to novel cyclopentanophenanthrene derivatives and to a process for the production thereof.

More particularly, the present invention relates to novel 19-lower alkyl-19-hydroxy and 19-lower alkyl-19-keto-Δ⁴-pregnen-20-one derivatives and to 19-lower alkyl-19-hydroxy and 19-lower alkyl-19-keto derivatives of cortical hormones.

The novel compounds of the present invention are represented by the following formulae:

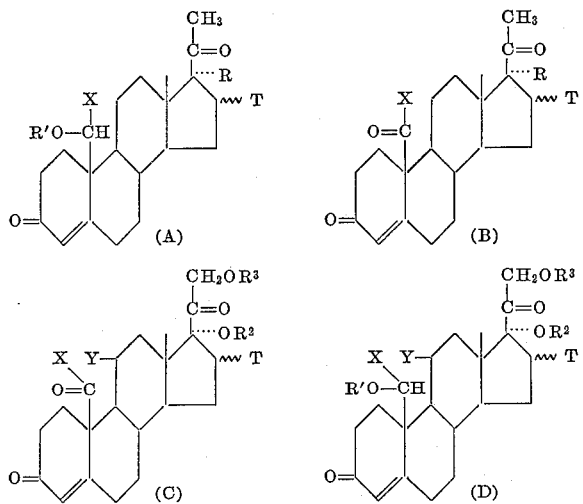

In the above formulae R represents hydrogen, hydroxyl or a hydrocarbon carboxylic acyloxy group of less than 12 carbon atoms; T represents hydrogen, α-hydroxy, α-acyloxy, α-methyl or β-methyl; T and R together represent the group

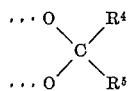

at the 16α, 17α-position, wherein $R^4$ and $R^5$ each represent a lower alkyl group; $R^1$ and $R^3$ each represent a hydrogen or a hydrocarbon carboxylic acyl group of less than 12 carbon atoms; $R^2$ is hydrogen; $OR^2$ and T together represent the group

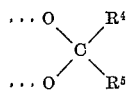

wherein $R^4$ and $R^5$ have the same meaning as defined above; Y represents a keto group or a β-hydroxy group; X represents a lower alkyl group.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by Formulae A and B are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The compounds represents by Formulae C and D are valuable cortical hormones with high anti-inflamatory, low catabolic, glycogenic and thymolytic activities. In addition, they are anti-androgenic, anti-gonadotrophic and anti-estrogenic hormones. Furthermore, they have high topical activity in skin disorders, such as psoriasis, alergic dermatitis and the like.

The novel compounds of the present invention are prepared by the process illustrated by the following formula scheme:

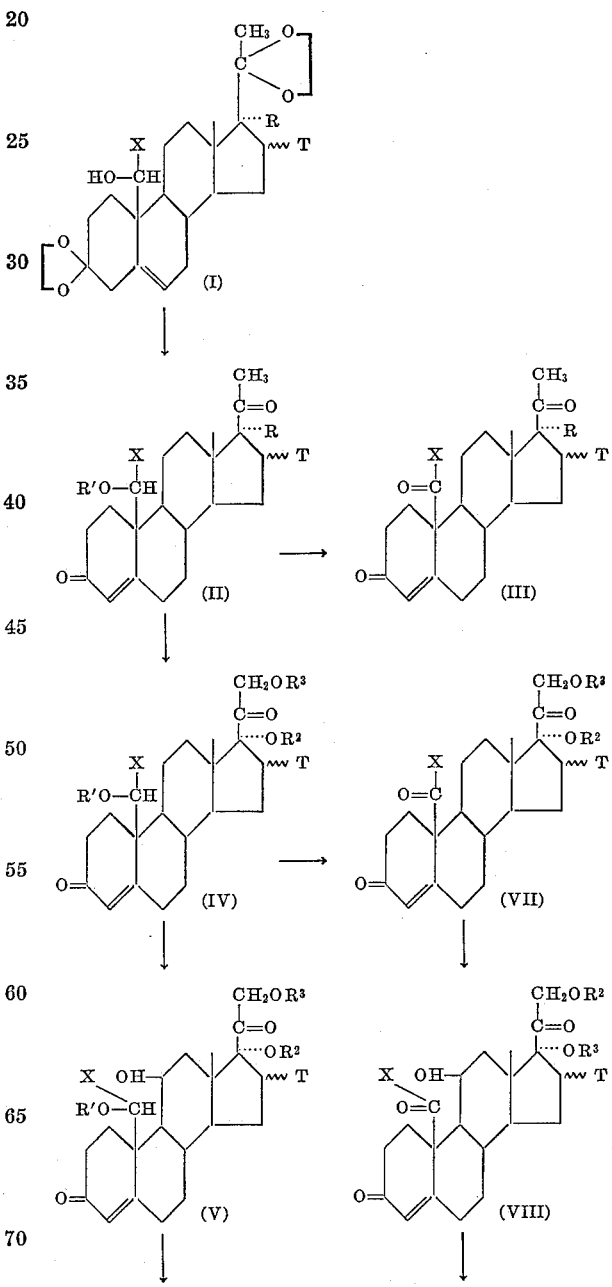

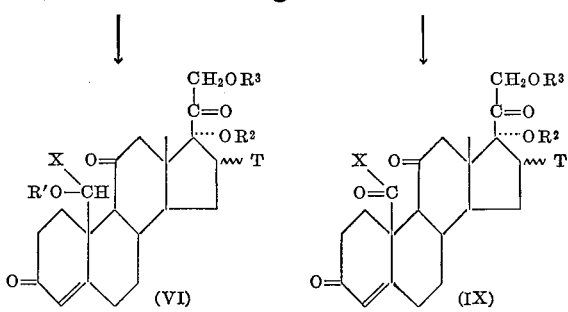

In the above formulate R, $R^1$, $R^2$, $R^3$, T and X have the same meaning as hereinbefore set forth.

In proceeding in accordance with the above scheme, the starting compound (I) which is a 19-lower alkyl-19 - hydroxy - 3,20 - bis - cycloethylenedioxy-$\Delta^5$-pregnene derivative, is conventionally treated with an acid to give the corresponding 19-lower alkyl - $\Delta^4$ - pregnen - 19 - ol-3,20-dione (II) which upon oxidation, preferably with Jones' reagent, yields the corresponding 19-lower alkyl-$\Delta^4$ - pregnene - 3,19,20 - trione compound (III). The 19-lower alkyl - $\Delta^4$ - pregnen - 19 - ol - 3,20 - dione derivatives having an oxygen at C-17α (II; R≠H) are treated with iodine, in the presence of calcium oxide, to give the corresponding 21-iodo derivatives, which, upon reaction with potassium acetate under anhydrous conditions, yield the corresponding 19-lower alkyl-$\Delta^4$-pregnene-17α,19,21-triol-3,20-dione 21-acetate derivatives (IV). The 19-free hydroxyl of the latter compounds is oxidized, preferably with Jones' reagent to give the corresponding 19-lower alkyl-$\Delta^4$-pregnene-17α,21-diol-3,19,20 - trione 21 - acetate compounds (VII). The 21-acetoxy compounds (VI, VII) upon incubation with adrenal glands in a suitable medium, e.g., an aqueous solution of alkali metal phosphates and chlorides and magnesium sulfate, mixed with an aqueous solution of fumaric acid and sodium hydroxide, for a period of time of the order of 3 hours, at approximately 28 to 30° C., yield the corresponding 21-acetoxy-11β-hydroxy compounds (V, VIII) which upon oxidation, preferably with Jones' reagent afford the corresponding 11-keto derivatives (VI, IX).

The compounds of the present invention having a 16α,17α-ketonide grouping yield the corresponding 16α,17α-diols by conventional treatment with a strong acid, such as formic acid. The obtained diols, upon conventional esterification in pyridine with an acylating agent, as for example acetic anhydride or caproic anhydride afford the corresponding 16-acylates.

The compounds of the present invention having a 21-acyloxy group, may be saponified by conventional treatment with a base to produce 21-free alcohols which in turn may be acylated conventionally in pyridine with an acylating agent to give the corresponding 21-acylates, wherein the acyl group may be different from the previously saponified one.

The compounds of the present invention having a 17α-hydroxy group, are esterfied in the presence of p-toluenesulfonic acid with an acylating agent, such as propionic anhydride, thus affording the corresponding 17α-acyloxy derivatives.

The following specific examples serve to illustrate but are not intended to limit the scope of the present invention:

*Example I*

A solution of 5 g. of 3,20-bis-cycloethylenedioxy-19-methyl-$\Delta^5$-pregnen-19-ol (obtained in accordance with my copending U.S. patent application Serial No. 201,797, filed June 12, 1962) in 250 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-methyl-$\Delta^4$-pregnen-19-ol-3,20-dione (Compound No. 1).

The starting compounds listed under I (obtained in accordance with the aforesaid patent application) were treated by the same technique, thus yielding the corresponding products under II.

| I | Compound No. | II |
|---|---|---|
| 3,20-bis-cycloethylenedioxy-16α,19-dimethyl-$\Delta^5$-pregnen-19-ol. | 2 | 16α,19-dimethyl-$\Delta^4$-pregnen-19-ol 3,20-dione. |
| 3,20-bis-cycloethylenedioxy-16β,19-dimethyl-$\Delta^5$-pregnen 19-ol. | 3 | 16β,19-dimethyl-$\Delta^4$-pregnen-19-ol-3,20-dione. |
| 3,20-bis-cycloethylenedioxy-16α,17α-isopropylidenedioxy-19-methyl-$\Delta^5$-pregnen-19-ol. | 4 | 16α,17α-isopropylidenedioxy-19-methyl-$\Delta^4$-pregnen-19-ol-3,20-dione. |
| 3,20-bis-cycloethylenedioxy-19-methyl-$\Delta^5$-pregnene-17α,19-diol. | 5 | 19-methyl-$\Delta^4$-pregnene-17α,19-diol 3,20-dione. |
| 3,20-bis-cycloethylenedioxy-16α,19-dimethyl-$\Delta^5$-pregnene-17α,19-diol. | 6 | 16α,19-dimethyl-$\Delta^4$-pregnene-17α,19-diol-3,20-dione. |
| 3,20-bis-cycloethylenedioxy-16β,19-dimethyl-$\Delta^5$-pregnene-17α,19-diol. | 7 | 16β,19-dimethyl-$\Delta^4$-pregnene-17α,19-diol-3,20-dione. |
| 3,20-bis-cycloethylenedioxy-19-ethyl-$\Delta^5$-pregnen-19-ol. | 8 | 19-ethyl-$\Delta^4$-pregnen-19-ol-3,20-dione. |
| 3,20-bis-cycloethylenedioxy-16α-methyl-19-ethyl-$\Delta^5$-pregnen-19-ol. | 9 | 16α-methyl-19-ethyl-$\Delta^4$-pregnen-19-ol-3,20-dione. |
| 3,20-bis-cycloethylenedioxy-16β-methyl-19-ethyl-$\Delta^5$-pregnen-19-ol. | 10 | 16β-methyl-19-ethyl-$\Delta^4$-pregnen-19-ol-3,20-dione. |
| 3,20-bis-cycloethylenedioxy-16α,17α-isopropylidenedioxy-19-ethyl-$\Delta^5$-pregnen-19-ol. | 11 | 16α,17α-isopropylidenedioxy-19-ethyl-$\Delta^4$-pregnen-19-ol-3,20-dione. |
| 3,20-bis-cycloethylenedioxy-19-ethyl-$\Delta^5$-pregnene-17α,19-diol. | 12 | 19-ethyl-$\Delta^4$-pregnene-17α,19-diol-3,20-dione. |
| 3,20-bis-cycloethylenedioxy-16α-methyl-19-ethyl-$\Delta^5$-pregnene-17α,19-diol. | 13 | 16α-methyl-19-ethyl-$\Delta^4$-pregnene-17α,19-diol-3,20-dione. |
| 3,20-bis-cycloethylenedioxy-16β-methyl-19-ethyl-$\Delta^5$-pregnene-17α,19-diol. | 14 | 16β-methyl-19-ethyl-$\Delta^4$-pregnene-17α,19-diol-3,20-dione. |

In preparing the aforementioned 19 - lower alkyl - 19 - hydroxy - 3,20-biscycloethylenedioxy - $\Delta^5$ - pregnene starting materials, a $\Delta^5$ - pregnene - 3β,19 - diol - 20 - one derivative is treated under Oppenauer conditions for approximately 15 minutes to produce the corresponding $\Delta^4$-pregnen-19-ol-3,20-dione, which upon reaction with ethylene glycol in the presence of p-toluenesulfonic acid yields the corresponding 3,20 - biscycloethylenedioxy - $\Delta^5$ - pregnen - 19 - ol. The 19-hydroxyl group of this 3,20-biscycloethylenedioxy compound is then oxidized in a neutral or slightly basic medium, preferably with chromium trioxide in pyridine, to give the corresponding 3,20 - biscycloethylenedioxy - $\Delta^5$ - pregnen - 19 ol, which upon treatment with a lower alkyl magnesium halide, such as methyl or ethyl magnesium bromide, or a lower alkyl lithium compound in an inert solvent, such as benzene, yields the corresponding 3,20-biscycloethylenedioxy-19-lower alkyl-19-hydroxy-$\Delta^5$-pregnene.

*Example II*

A solution of 1 g. of 19 - methyl - $\Delta^4$ - pregnen - 19-ol-3,20-dione (Compound No. 1) in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19-methyl-$\Delta^4$-pregnene-3,19,20-trione (Compound No. 15).

The Compounds Nos. 2 to 14, inclusive were treated following the same procedure, thus affording respectively:

Cpd. No.:
16. 16α,19-dimethyl-$\Delta^4$-pregnene-3,19,20-trione.
17. 16β,19-dimethyl-$\Delta^4$-pregnene-3,19,20-trione.
18. 16α,17α-isopropylidenedioxy-19-methyl-$\Delta^4$-pregnene-3,19,20-trione.
19. 19-methyl-$\Delta^4$-pregnen-17α-ol-3,19,20-trione.
20. 16α,19-dimethyl-$\Delta^4$-pregnen-17α-ol-3,19,20-trione.
21. 16β,19-dimethyl-$\Delta^4$-pregnen-17α-ol-3,19,20-trione.
22. 19-ethyl-$\Delta^4$-pregnene-3,19,20-trione.
23. 16α-methyl-19-ethyl-$\Delta^4$-pregnene-3,19,20-trione.
24. 16β-methyl-19-ethyl-$\Delta^4$-pregnene-3,19,20-trione.
25. 16α,17α-isopropylidenedioxy-19-ethyl-$\Delta^4$-pregnene-3,19,20-trione.
26. 19-ethyl-$\Delta^4$-pregnen-17α-ol-3,19,20-trione.
27. 16α-methyl-19-ethyl-$\Delta^4$-pregnen-17α-ol-3,19,20-trione.
28. 16β-methyl-19-ethyl-$\Delta^4$-pregnen-17α-ol-3,19,20-trione.

*Example III*

A cooled solution of 4 g. of 16α,17α-isopropylidenedioxy - 19 - methyl - $\Delta^4$ - pregnen - 19 - ol - 3,20 - dione (Compound No. 4) in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-iodo derivative of the starting compound.

This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding the 21-acetate of 16α,17α - isopropylidenedioxy - 19 - methyl - $\Delta^4$ - pregnene-19,21-diol-3,20-dione (Cpd. No. 29).

Following the same procedure, there were treated the Compounds Nos. 5, 6, 7, 11, 12, 13, and 14, thus affording respectively:

Cpd. No.:
30. The 21-acetate of 19-methyl-$\Delta^4$-pregnene-17α,19,21-triol-3,20-dione.
31. The 21-acetate of 16α,19-dimethyl-$\Delta^4$-pregnene-17α,19,21-triol-3,20-dione.
32. The 21-acetate of 16β,19-dimethyl-$\Delta^4$-pregnene-17α,19,21-triol-3,20-dione.
33. The 21-acetate of 16α,17α-isopropylidenedioxy-19-ethyl-$\Delta^4$-pregnene-19,21-diol-3,20-dione.
34. The 21-acetate of 19-ethyl-$\Delta^4$-pregnene-17α,19,21-triol-3,20-dione.
35. The 21-acetate of 16α-methyl-19-ethyl-$\Delta^4$-pregnene-17α,19,21-triol-3,20-dione.
36. The 21-acetate of 16β-methyl-19-ethyl-$\Delta^4$-pregnene-17α,19,21-triol-3,20-dione.

*Example IV*

The Compounds Nos. 29 to 36, inclusive, were treated according to Example 2, thus giving respectively:

Cpd. No.:
37. 16α,17α-isopropylidenedioxy-19-methyl-$\Delta^4$-pregnen-21-ol-3,19,20-trione acetate.
38. 19-methyl-$\Delta^4$-pregnene-17α,21-diol-3,19,20-trione 21-acetate.
39. 16α,19-dimethyl-$\Delta^4$-pregnene-17α,21-diol-3,19,20-trione 21-acetate.
40. 16β,19-dimethyl-$\Delta^4$-pregnene-17α,21-diol-3,19,20-trione 21-acetate.
41. 16α,17α-isopropylidenedioxy-19-ethyl-$\Delta^4$-pregnen-21-ol-3,19,20-trione acetate.
42. 19-ethyl-$\Delta^4$-pregnene-17α,21-diol-3,19,20-trione 21-acetate.
43. 16α-methyl-19-ethyl-$\Delta^4$-pregnene-17α,21-diol-3,19,20-trione 21-acetate.
44. 16β-methyl-19-ethyl-$\Delta^4$-pregnene-17α,21-diol-3,19,20-trione 21-acetate.

*Example V*

The following solutions "A," "B" and "C" were prepared using distilled water as solvent solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B, and C solution with vigorous stirring. To the mixture there was then added 1 g. of Compound No. 29 dissolved in 5.35 parts of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 16α,17α-isopropylidenedioxy - 19 - methyl - $\Delta^4$ - pregnene-11β,19,21-triol-3,20-dione 21-acetate (Cpd. No. 45).

Following the same procedure there were treated the Compounds Nos. 30 to 44, inclusive, thus yielding respectively:

Cpd. No.:
46. 19-methyl-$\Delta^4$-pregnene-11β,17α,19,21-tetrol-3,20-dione 21-acetate.
47. 16α,19-dimethyl-$\Delta^4$-pregnene-11β,17α,19,21-tetrol-3,20-dione 21-acetate.
48. 16β,19-dimethyl-$\Delta^4$-pregnene-11β,17α,19,21-tetrol-3,20-dione 21-acetate.
49. 16α,17α-isopropylidenedioxy-19-ethyl-$\Delta^4$-pregnene-11β,19,21-triol-3,20-dione 21-acetate.
50. 19-ethyl-$\Delta^4$-pregnene-11β,17α,19,21-tetrol-3,20-dione 21-acetate.
51. 16α-methyl-19-ethyl-$\Delta^4$-pregnene-11β,17α,19,21-tetrol-3,20-dione 21-acetate.
52. 16β-methyl-19-ethyl-$\Delta^4$-pregnene-11β,17α,19,21-tetrol-3,20-dione 21-acetate.
53. 16α,17α-isopropylidenedioxy-19-methyl-$\Delta^4$-pregnene-11β,21-diol-3,19,20-trione 21-acetate.
54. 19-methyl-$\Delta^4$-pregnene-11β,17α,21-triol-3,19,20-trione 21-acetate.
55. 16α,19-dimethyl-$\Delta^4$-pregnene-11β,17α,21-triol-3,19,20-trione 21-acetate.
56. 16β,19-dimethyl-$\Delta^4$-pregnene-11β,17α,21-triol-3,19,20-trione 21-acetate.
57. 16α,17α-isopropylidenedioxy-19-ethyl-$\Delta^4$-pregnene-11β,21-diol-3,19,20-trione 21-acetate.
58. 19-ethyl-$\Delta^4$-pregnene-11β,17α,21-triol-3,19,20-trione 21-acetate.
59. 16α-methyl-19-ethyl-$\Delta^4$-pregnene-11β,17α,21-triol-3,19,20-trione 21-acetate.
60. 16β-methyl-19-ethyl-$\Delta^4$-pregnene-11β,17α,21-triol-3,19,20-trione 21-acetate.

Example VI

A mixture of 1 g. of 16α,17α-isopropylidenedioxy-19-methyl-Δ⁴-pregnene-11β,19,21-triol-3,20-dione 21-acetate (Cpd. No. 45) 4 cc. of pyridine and 2 cc. of acetic anhydride was kept at room temperature overnight, poured into ice water, the formed precipitate was filtered, washed with water and dried. Crystallization from acetone-hexane gave 16α,17α-isopropylidenedioxy-19-methyl-Δ⁴-pregnene-11β,19,21-triol-3,20-dione 19,21-diacetate (Cpd. No. 61).

By the same procedure, the Compounds Nos. 46 to 52, inclusive, were respectively converted into:

Cpd. No.:
- 62. 19-methyl-Δ⁴-pregnene-11β,17α,19,21-tetrol-3,20-dione 19,21-diacetate.
- 63. 16α,19-dimethyl-Δ⁴-pregnene-11β,17α,19,21-tetrol-3,20-dione 19,21-diacetate.
- 64. 16β,19-dimethyl-Δ⁴-pregnene-11β,17α,19,21-tetrol-3,20-dione 19,21-diacetate.
- 65. 16α,17α-isopropylidenedioxy-19-ethyl-Δ⁴-pregnene-11β,19,21-triol-3,20-dione 19,21-diacetate.
- 66. 19-ethyl-Δ⁴-pregnene-11β,17α,19,21-tetrol-3,20-dione 19,21-diacetate.
- 67. 16α-methyl-19-ethyl-Δ⁴-pregnene-11β,17α,19,21-tetrol-3,20-dione 19,21-diacetate.
- 68. 16β-methyl-19-ethyl-Δ⁴-pregnene-11β,17α,19,21-tetrol-3,20-dione 19,21-diacetate.

Example VII

The Compounds Nos. 53 to 68, inclusive, were treated in accordance with Example 2, thus giving respectively:

Cpd. No.:
- 69. 16α,17α-isopropylidenedioxy-19-methyl-Δ⁴-pregnen-21-ol-3,11,19,20-tetrone acetate.
- 70. 19-methyl-Δ⁴-pregnene-17α,21-diol-3,11,19,20-tetrone 21-acetate.
- 71. 16α19-dimethyl-Δ⁴-pregnene-17α,21-diol-3,11,19,20-tetrone 21-acetate.
- 72. 16β,19-dimethyl-Δ⁴-pregnene-17α,21-diol-3,11,19,20-tetrone 21-acetate.
- 73. 16α,17α-isopropylidenedioxy-19-ethyl-Δ⁴-pregnen-21-ol-3,11,19,20-tetrone 21-acetate.
- 74. 19-ethyl-Δ⁴-pregnene-17α,21-diol-3,11,19,20-tetrone 2-acetate.
- 75. 16α-methyl-19-ethyl-Δ⁴-pregnene-17α,21-diol-3,11,19,20-tetrone 21-acetate.
- 76. 16β-methyl-19-ethyl-Δ⁴-pregnene-17α,21-diol-3,11,19,20-tetrone 21-acetate.
- 77. 16α,17α-isopropylidenedioxy-19-methyl-Δ⁴-pregnene-19,21-diol-3,11,20-trione 19,21-diacetate.
- 78. 19-methyl-Δ⁴-pregnene-17α,19,21-triol-3,11,20-trione 19,21-diacetate.
- 79. 16α,19-dimethyl-Δ⁴-pregnene-17α,19,21-triol-3,11,20-trione 19,21-diacetate.
- 80. 16β,19-dimethyl-Δ⁴-pregnene-17α,19,21-triol-3,11,20-trione 19,21-diacetate.
- 81. 16α,17α-isopropylidenedioxy-19-ethyl-Δ⁴-pregnene-19,21-diol-3,11,20-trione 19,21-diacetate.
- 82. 19-ethyl-Δ⁴-pregnene-17α,19,21-triol-3,11,20-trione 19,21-diacetate.
- 83. 16α-methyl-19-ethyl-Δ⁴-pregnene-17α,19,21-triol-3,11,20-trione 19,21-diacetate.
- 84. 16β-methyl-19-ethyl-Δ⁴-pregnene-17α,19,21-triol-3,11,20-trione 19,21-diacetate.

Example VIII

A suspension of 1 g. of Compound No. 45 in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 16α,17α-isopropylidenedioxy - 19-methyl-Δ⁴-pregnene-11β,19,21-triol-3,20-dione (Cpd. No. 85).

Following the same procedure there were treated the Compounds Nos. 46 to 60, inclusive, thus yielding respectively the following compounds:

Cpd. No.:
- 86. 19-methyl-Δ⁴-pregnene-11β,17α,19,21-tetrol-3,20-dione.
- 87. 16α,19-dimethyl-Δ⁴-pregnene-11β,17α,19,21-tetrol-3,20-dione.
- 88. 16β,19-dimethyl-Δ⁴-pregnene-11β,17α,19,21-tetrol-3,20-dione.
- 89. 16α,17α-isopropylidenedioxy-19-ethyl-Δ⁴-pregnene-11β,19,21-triol-3,20-dione.
- 90. 19-ethyl-Δ⁴-pregnene-11β,17α,19,21-tetrol-3,20-dione.
- 91. 16α-methyl-19-ethyl-Δ⁴-pregnene-11β,17α,19,21-tetrol-3,20-dione.
- 92. 16β-methyl-19-ethyl-Δ⁴-pregnene-11β,17α,19-21-tetrol-3-20-dione.
- 93. 16α,17α-isopropylidenedioxy-19-methyl-Δ⁴-pregnene-11β,21-diol-3,19,20-trione.
- 94. 19-methyl-Δ⁴-pregnene-11β,17α,21-triol-3,19,20-trione.
- 95. 16α,19-dimethyl-Δ⁴-pregnene-11β,17α,21-triol-3,19,20-trione.
- 96. 16β,19-dimethyl-Δ⁴-pregnene-11β,17α,21-triol-3,19,20-trione.
- 97. 16α,17α-isopropylidenedioxy-19-ethyl-Δ⁴-pregnene-11β,21-diol-3,19,20-trione.
- 98. 19-ethyl-Δ⁴-pregnene-11β,17α,21-triol-3,19,20-dione.
- 99. 16α-methyl-19-ethyl-Δ⁴-pregnene-11β,17α,21-triol-3,19,20-trione.
- 100. 16β-methyl-19-ethyl-Δ⁴-pregnene-11β,17α,21-triol-3,19,20-trione.

Example IX

The Compounds Nos. 69 to 84, inclusive, were treated in accordance with Example 8, thus yielding respectively:

Cpd. No.:
- 101. 16α,17α-isopropylidenedioxy-19-methyl-Δ⁴-pregnen-21-ol-3,11,19,20-tetrone.
- 102. 19-methyl-Δ⁴-pregnene-17α,21-diol-3,11,19,20-tetrone.
- 103. 16α,19-dimethyl-Δ⁴-pregnene-17α,21-diol-3,11,19,20-tetrone.
- 104. 16β,19-dimethyl-Δ⁴-pregnene-17α,21-diol-3,11,19,20-tetrone.
- 105. 16α,17α-isopropylidenedioxy-19-ethyl-Δ⁴-pregnen-21-ol-3,11,19,20-tetrone.
- 106. 19-ethyl-Δ⁴-pregnene-17α,21-diol-3,11,19,20-tetrone.
- 107. 16α-methyl-19-ethyl-Δ⁴-pregnene-17α,21-diol-3,11,19,20-tetrone.
- 108. 16β-methyl-19-ethyl-Δ⁴-pregnene-17α,21-diol-3,11,19,20-tetrone.
- 109. 16α,17α-isopropylidenedioxy-19-methyl-Δ⁴-pregnene-19,21-diol-3,11,20-trione.
- 110. 19-methyl-Δ⁴-pregnene-17α,19,21-triol-3,11,20-trione.
- 111. 16α,19-dimethyl-Δ⁴-pregnene-17α,19,21-triol-3,11,20-trione.
- 112. 16β,19-dimethyl-Δ⁴-pregnene-7α,19,21-triol-3,11,20-trione.
- 113. 16α,17α-isopropylidenedioxy-19-ethyl-Δ⁴-pregnene-19,21-diol-3,11,20-trione.
- 114. 19-ethyl-Δ⁴-pregnene-17α,19,21-triol-3,11,20-trione.
- 115. 16α-methyl-19-ethyl-Δ⁴-pregnene-17α,19,21-triol-3,11,20-trione.
- 116. 16β-methyl-19-ethyl-Δ⁴-pregnene-17α,19,21-triol-3,11,20-trione.

Example X 1 g. of 16α,17α-isopropylidenedioxy-19-methyl-Δ⁴-pregnen-19-ol-3,20-dione (Cpd. No. 4) was heated on the steam bath with 20 cc. of 60% formic acid for 1 hour, cooled, diluted with water and the precipitate was collected, washed with water, dried, and recrystallized from acetone-hexane, thus affording 19-methyl-Δ⁴-pregnene-16α,17α,19-triol-3,20-dione (Cpd. No. 117).

The Compounds Nos. 11, 18, 25, 85, 89, 93, 97, 101, 105, 109, and 113 were treated by the same procedure, thus giving:

Cpd. No.:
118. 19-ethyl-Δ⁴-pregnene-16α,17α-19-triol-3,20-dione.
119. 19-methyl-Δ⁴-pregnene-16α,17α-diol-3,19,20-trione.
120. 19-ethyl-Δ⁴-pregnene-16α,17α-diol-3,19,20-trione.
121. 19-methyl-Δ⁴-pregnene-11β,16α,17α,19,21-pentol-3,20-dione.
122. 19-ethyl-Δ⁴-pregnene-11β,16α,17α,19,21-pentol-3,20-dione.
123. 19-methyl-Δ⁴-pregnene-11β,16α,17α,21-tetrol-3,19,20-trione.
124. 19-ethyl-Δ⁴-pregnene-11β,16α,17α,21-tetrol-3,19,20-trione.
125. 19-methyl-Δ⁴-pregnene-16α,17α,21-triol-3,11,19,20-tetrone.
126. 19-ethyl-Δ⁴-pregnene-16α,17α,21-triol-3,11,19,20-tetrone.
127. 19-methyl-Δ⁴-pregnene-16α,17α,19,21-tetrol-3,11,20-trione.
128. 19-ethyl-Δ⁴-pregnene-16α,17α,19,21-tetrol-3,11,20-trione.

Example XI

The Compounds Nos. 86, 90, 94, and 98 were treated in accordance with Example VI, except that acetic anhydride was substituted by caproic anhydride, thus affording respectively:

Cpd. No.:
129. 19-methyl-Δ⁴-pregnene-11β,17α,19,21-tetrol-3,20-dione 19,21-dicaproate.
130. 19-ethyl-Δ⁴-pregnene-11β,17α,19,21-tetrol-3,20-dione 19,21-dicaproate.
131. 19-methyl-Δ⁴-pregnene-11β,17α,21-triol-3,19,20-trione 21-caproate.
132. 19-ethyl-Δ⁴-pregnene-11β,17α,21-triol-3,19,20-trione 21-caproate.

Example XII

The Compounds Nos. 117 to 128, inclusive, were treated in accordance with Example XI, thus yielding respectively:

Cpd. No.:
133. 19-methyl-Δ⁴-pregnene-16α,17α,19-triol-3,20-dione 16,19-dicaproate.
134. 19-ethyl-Δ⁴-pregnene-16α,17α,19-triol-3,20-dione 16,19-dicaproate.
135. 19-methyl-Δ⁴-pregnene-16α,17α-diol-3,19,20-trione 16-caproate.
136. 19-ethyl-Δ⁴-pregnene-16α,17α,diol-3,19,20-trione 16-caproate.
137. 19-methyl-Δ⁴-pregnene-11β,16α,17α,19,21-pentol-3,20-dione 16,19,21-tricaproate.
138. 19-ethyl-Δ⁴-pregnene-11β,16α,17α,19,21-pentol-3,20-dione 16,19,21-tricaproate.
139. 19-methyl-Δ⁴-pregnene-11β,16α,17α,21-tetrol-3,19,20-trione 16,21-dicaproate.
140. 19-ethyl-Δ⁴-pregnene-11β,16α,17α,21-tetrol-3,19,20-trione 16,21-dicaproate.
141. 19-methyl-Δ⁴-pregnene-16α,17α,21-triol-3,11,19,20-tetrone 16,21-dicaproate.
142. 19-ethyl-Δ⁴-pregnene-16α,17α,21-triol-3,11,19,20-tetrone 16,21-dicaproate.
143. 19-methyl-Δ⁴-pregnene-16α,17α,19,21-tetrol-3,11,20-trione 16,19,21-tricaproate.
144. 19-ethyl-Δ⁴-pregnene-16α,17α,19,21-tetrol-3,11,20-trione 16,19,21-tricaproate.

Example XIII

To a solution of 5 g. of 19-methyl-Δ⁴-pregnene-17α,19-diol-3,20-dione (Cpd. No. 5) in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-methyl-Δ⁴-pregnene-17α,19-diol-3,20-dione dipropionate (Cpd. No. 145).

Following the same procedure there were treated the Compounds Nos. 6, 7, 12, 13, and 14 yielding respectively:

Cpd. No.:
146. 16α,19-dimethyl-Δ⁴-pregnene-17α,19-diol-3,20-dione dipropionate.
147. 16β,19-dimethyl-Δ⁴-pregnene-17α,19-diol-3,20-dione dipropionate.
148. 19-ethyl-Δ⁴-pregnene-17α,19-diol-3,20-dione dipropionate.
149. 16α-methyl-19-ethyl-Δ⁴-pregnene-17α,19-diol-3,20-dione dipropionate.
150. 16β-methyl-19-ethyl-Δ⁴-pregnene-17α,19-diol-3,20-dione dipropionate.

I claim:
1. 16α,17α - isopropylidenedioxy-19-methyl-Δ⁴-pregnen-19-ol-3,20-dione.
2. 16α,17α - isopropylidenedioxy-19-ethyl-Δ⁴-pregnen-19-ol-3,20-dione.
3. A compound of the following formula:

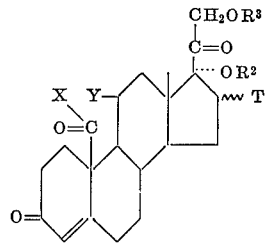

wherein $R^2$ is a hydrogen atom; T is a member of the group consisting of hydrogen, α-hydroxy, α-hydrocarbon carboxylic acyloxy of less than 12 carbons, α-methyl and β-methyl; $OR^2$ and T together are the group

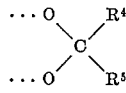

wherein $R^4$ and $R^5$ each is a lower alkyl group; Y is selected from the group consisting of β-hydroxyl and keto; X is a lower alkyl group and $R^3$ is selected from the group consisting of hydrogen and a hydrocarbon carboxylic acyl group of less than 12 carbon atoms.

4. 19-methyl-Δ⁴-pregnene-11β,17α,21-triol-3,19,20 - trione 21-acetate.
5. 19-ethyl-Δ⁴-pregnene-11β,17α,21-triol - 3,19,20-trione 21-acetate.
6. 19-methyl-Δ⁴-pregnene - 17α,21 - diol-3,11,19,20-tetrone 21-acetate.
7. 19-ethyl-Δ⁴-pregnene - 17α,21-diol-3,11,19,20-tetrone 21-acetate.
8. 19-methyl-Δ⁴-pregnene - 17α,19,21-triol-3,11,20-trione.

9. 19-ethyl-Δ⁴-pregnene - 17α,19,21-triol-3,11,20-trione.

10. A compound represented by the formula:

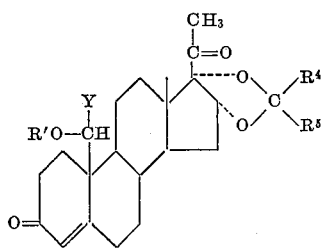

wherein R' is selected from the group consisting of hydrogen and a hydrocarbon carboxylic acyl group of less than 12 carbon atoms; and $R^4$, $R^5$ and X each represent a lower alkyl group.

11. A compound represented by the formula:

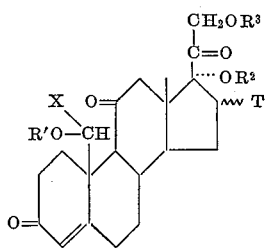

wherein $R^2$ is a hydrogen atom; T is a member of the group consisting of hydrogen, α-hydroxy, α-hydrocarbon carboxylic acyloxy of less than 12 carbon atoms, α-methyl and β-methyl, $OR^2$ and T together are the group

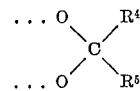

wherein $R^4$ and $R^5$ each represent a lower alkyl group; X is a lower alkyl group and R' and $R^3$ are selected from the group consisting of hydrogen and a hydrocarbon carboxylic acyl group of less than 12 carbon atoms.

References Cited by the Examiner
UNITED STATES PATENTS

| | | | |
|---|---|---|---|
| 2,969,304 | 1/61 | Wettstein et al. | 195—51 |
| 3,014,931 | 12/61 | Nishikawa et al. | 260—397.1 |
| 3,039,926 | 6/62 | Shull | 167—65 |
| 3,087,940 | 4/63 | Rubin | 260—397.4 |

LEWIS GOTTS, *Primary Examiner.*

UNITED STATES PATENT OFFICE
CERTIFICATE OF CORRECTION

Patent No. 3,213,085                 October 19, 1965

Albert Bowers

It is hereby certified that error appears in the above numbered patent requiring correction and that the said Letters Patent should read as corrected below.

Column 11, lines 3 to 12, the formula should appear as shown below instead of as in the patent:

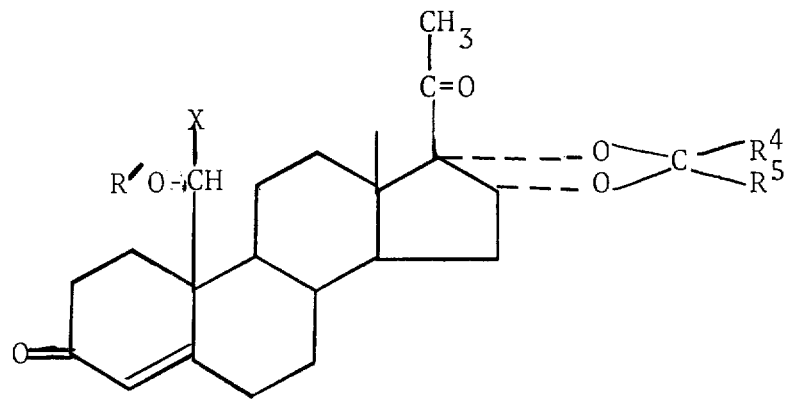

Signed and sealed this 24th day of May 1966.

(SEAL)
Attest:

ERNEST W. SWIDER                 EDWARD J. BRENNER
Attesting Officer                Commissioner of Patent